United States Patent [19]

Murakami

[11] Patent Number: 4,519,969
[45] Date of Patent: May 28, 1985

[54] STRETCHED FLUORINE TYPE FILM AND METHOD FOR MANUFACTURE THEREOF

[75] Inventor: Kunio Murakami, Kyoto, Japan

[73] Assignee: Unitika Ltd., Hyogo, Japan

[21] Appl. No.: 649,003

[22] Filed: Sep. 10, 1984

[30] Foreign Application Priority Data

Sep. 9, 1983 [JP] Japan ................. 58-166937

[51] Int. Cl.³ .............................................. C08J 5/18
[52] U.S. Cl. ............................ 264/210.7; 264/290.2; 526/255
[58] Field of Search ................. 526/255; 264/210.7, 264/290.2

[56] References Cited

U.S. PATENT DOCUMENTS 3,315,020 4/1967 Gore ................................ 526/255
3,813,461 5/1974 Murayama ..................... 264/290.2

*Primary Examiner*—Paul R. Michl
*Attorney, Agent, or Firm*—Sughrue, Mion, Zinn, Macpeak & Seas

[57] ABSTRACT

A biaxially stretched film and a method for the manufacture thereof, containing at least 90 mol % of ethylene-tetrafluoroethylene copolymer, having a value of crystallization property, $\Delta T$, expressed by the equation $$\Delta T = T_m - T_c$$

wherein
  $T_m$ (melting point) stands for the peak melting temperature (°C.) found when a sample is heated at a temperature increase rate of 20° C./minute using differential scanning calorimeter (DSC), and
  $T_c$ (crystallizing temperature during fall of temperature) stands for the peak crystallizing temperature (°C.) found when the sample is cooled at a temperature decrease rate of 80° C./minute from the melting point plus 20° C. using said DSC,
of not less than 15° C. and not more than 60° C.,
  prepared by a method comprising heating a thermoplastic resin containing at least 90 mol % of ethylene-tetrafluoroethylene copolymer to form a molten resin, extruding the molten resin through a die, and cooling the extruded molten resin at a cooling speed of at least 70° C./second in the range of the melting point minus 10° C. to the melting point minus 100° C. to thereby form a film while simultaneously biaxially stretching said film to at least two times the original size in each of the longitudinal and lateral directions.

22 Claims, No Drawings

STRETCHED FLUORINE TYPE FILM AND METHOD FOR MANUFACTURE THEREOF

FIELD OF THE INVENTION

This invention relates to a fluorine type resin film and to a method for the stretching of the film. More particularly, this invention relates to a biaxially stretched film of an ethylene-tetrafluoroethylene copolymer and to a method for the manufacture of the film.

BACKGROUND OF THE INVENTION

The fluorine type resins are represented by polytetrafluoroethylene, and also include polyvinylidene fluoride, polyvinyl fluoride, fluorinated ethylene-propylene copolymer, perfluoroalkyl ethers, etc. Some of them are used in the form of film. With the exception of polyvinyl fluoride, the films of these resins are typically used in an unstretched condition. Most of them have poor strength and undesirably low resistance to heat. The fluorine type resins excel in weather-ability, resistance to chemicals, electric properties, and releasability from molds, and find extensive utility in numerous applications. When they are used in the form of film, however, because they are deficient in strength and thermal stability, they frequently fail to adequately serve their intended purposes, and thus are of limited utility.

SUMMARY OF THE INVENTION

The present inventors have conducted extensive studies in search for a solution to the foregoing problems. They have consequently accomplished this invention, which concerns a method for the manufacture of a stretched fluorine type film.

Specifically, this invention relates to a biaxially stretched film containing at least 90 mol % of an ethylene-tetrafluoroethylene copolymer, and to a method for the manufacture of this film.

DETAILED DESCRIPTION OF THE INVENTION

The biaxially stretdhed film produced by the method of this invention possesses strength at least about three times the strength of the film in its unstretched form, and, by means of the heat setting treatment, acquires outstanding resistance to heat. Thus, the film is suitably useful in fields in which the conventional films of fluorine type resins have been difficult to usefully apply. The biaxial stretching permits the film of this invention to be produced and used in decreased thicknesses and to find adoption in new fields. When the unstretched film containing at least 90 mol % of ethylene-tetrafluoroethylene copolymer is stretched in the longitudinal and lateral directions, each to at least two times the original size, the biaxially stretched film acquires a tensile strength exceeding 13 kg/mm$^2$, a surprisingly high level in contrast to the tensile strength of about 4 kg/mm$^2$ possessed by the unstretched film. The biaxial stretching also surprisingly increases the tensile modulus from the low level of about 60 kg/mm$^2$ to more than 100 kg/mm$^2$.

The ethylene-tetrafluoroethylene copolymer resin according to this invention proves desirable in terms of film-forming properties and stretching properties particularly when the molar ratio of ethylene to tetrafluoroethylene falls in the range of from 40/60 to 70/30, and more preferably in the range of from 45/55 to 60/40.

Further, the stretchability of the film is notably enhanced by adding to the copolymerization system a third component capable of repressing the resin crystallinity. A fluoroolefin other than tetrafluoroethylene serves effectively as the third component. Examples of the fluoroolefin include vinyl fluoride, vinylidene fluoride, chlorotrifluoroethylene, propylene hexafluoride, trifluoroethylene, difluoroethylene, dichlorodifluoroethylene, chlorofluoroethylene, dichlorodifluoropropylene, trichlorotrifluoropropylene, tetrafluorodichloropropylene, chloropentafluoropropylene, dichlorotrifluoropropylene, chlorotetrafluoropropylene, pentafluoropropylene, tetrafluoropropylene, and trifluoropropylene. Such a fluoroolefin is desired to be incorporated into the copolymerization system in an amount such as to give to the produced copolymer a total fluorine content of from 40 to 75% by weight. The molar ratio of tetrafluoroethylene to other fluoroolefin is desirably in the range of from 1/0.1 to ½.

Optionally, the resin may further incorporate therein an ultraviolet light interceptor such as powdered titanium oxide or powdered carbon, an ultraviolet light absorbant such as anthraquinone or anthracene, or a slip improving agent such as silica or kaolin.

The ethylene-tetrafluoroethylene copolymer resin has a high crystallizing speed. At a normal cooling speed for film formation, therefore, it cannot be stretched uniformly because the crystallization proceeds excessively in the resin.

As the criterion for the crystallizing speed, the difference between the melting point and the crystallizing temperature during the fall of temperature, namely the difference of temperature between the melting temperature and the temperature of recrystallization, is generally adopted. The crystallizing speed decreases and the ease of crystallization also decreases in proportion as this temperature difference increases. The crystallizing temperature tends to increase and the difference between the melting point and the crystallizing temperature during the fall of temperature tends to decrease in proportion as the speed of temperature fall from the melting point increases. When this particular criterion is used, therefore, the speed of temperature fall must be defined.

Thus, the speed of temperature fall after the melting of the resin was fixed at 80° C./minute and an experiment was conducted concerning the difference (a value of crystallization property: $\Delta T$) between the melting point and the crystallizing temperature during the temperature fall with the aid of a differential scanning calorimeter (DSC). The inventors established by this experiment that satisfactory and uniform film stretching is obtained when this temperature difference ($\Delta T$) is not less than 15° C., and preferably is not less than 20° C., and is not more than 60° C., and preferably is not more than 55° C. If this temperature difference is less than 15° C., the crystallization proceeds so excessively as to render uniform stretching difficult and production of a film of uniform physical properties impracticable. If the temperature difference exceeds 60° C., the crystallization degree is too low to give the produced film ample resistance to heat.

The melting point ($T_m$) is defined to be the peak melting temperature found when a given sample is heated at a temperature increase rate of 20° C./minute in the DSC. The peak crystallizing temperature found when the temperature is lowered at a temperature decrease rate of 80° C./minute immediately after the heated resin has reached the melting point plus 20° C. is defined as the crystallizing temperature during the temperature fall ($T_c$).

To repress the crystallization of the resin during film formation, the resin extruded through the die must be cooled. Based on inventors studies concerning the cooling speed of the resin during the film formation, they have consequently determined that the desired repression of crystallization is obtained by cooling the resin during the film formation at a speed of not less than 70° C./second in the temperature range between the melting point minus 10° C. and the melting point minus 100° C.

There are two methods available for the biaxial stretching of film: (1) a two-way successively biaxial stretching method which comprises stretching the film in one axis and then stretching the film in a direction perpendicular to the aforementioned axis, and (2) a simultaneous biaxial stretching method which comprises stretching the film simultaneously in two perpendicularly intersecting directions. In the case of the ethylenetetrafluoroethylene copolymer, the two-way successively biaxial stretching method gives desired stretching at high ratio with difficulty. A possible reason for this difficulty is that during the first stretching, the molecular chains of the resin are monoaxially oriented to a high degree such that the film is liable to tear along the axis of orientation during the subsequent stretching.

In the case of simultaneous biaxial stretching, since the stretching occurs in the longitudinal and lateral directions at the same time, the molecular chains of the resin are oriented in a well-balanced condition in the longitudinal and lateral directions. Thus, the resin can be stretched at a high ratio without entailing the possibility of breakage. For the effect of the stretching to suitably elevate the strength, the ratio of stretching is required to exceed 2.0 times, and preferably exceeds 2.5 times, the original size in each of the longitudinal and lateral directions. The manner of effecting the simultaneous biaxial stretching is not particularly limited. For example, either the tenter method or the tubular method will do. As pointed out hereinafter in the comparative experiment, the stretching temperature must be selected within a suitable range. The range suitable for this invention is generally between 50° C. and 160° C., and preferably between 70° C. and 150° C. If this temperature is less than 50° C., the stress of stretching is so high as to tend to cause rupture of the film when the ratio of stretching exceeds 2 times. When it is raised past the lower limit of 50° C., the stress of stretching is sharply lowered, enough for the stretching to be performed without difficulty. If the stretching temperature exceeds 160° C., the crystallization of resin proceeds more than is required, tending to cause the phenomenon of necking to occur, which prevents the production of a stretched film of uniform properties.

The stretched film obtained as described above does not have sufficiently high thermal stability in its unaltered form, and, in that state, does not endure service at high temperatures. When the stretched film is meant for use at higher temperatures, therefore, it is required to be heat set. The heat setting gives desirable results when it is performed at temperatures exceeding 160° C. and not exceeding the melting point, desirably in the range of 180° C. and 240° C. The heat setting is desired to be carried out in a condition of limited shrinkage within 20%, increased length, or fixed length.

When the stretch film is intended, e.g., as a shrink-fitting film, it can be immediately used advantageously without being heat set.

The stretched film produced by the method of this invention excels over conventional unstretched film in terms of mechanical properties. It can be produced in any thickness between about 500μ and 2μ. Owing to its outstanding weatherability, this film finds utility in the production of surface protecting film, solar film, solar battery base and exterior coating, and coating for noise-abating wall. Owing to high electric properties and resistance to heat, the film finds utility in the production of electrically insulating film, electrically insulating tape, and condensor. Having high resistance to chemicals and good mold releasability, it also finds utility in the production of protective film for interior articles, mold-release film, and corrosionproofing film. The film, when not heat set, proves useful as a shrink-fitting film for use on exterior articles expected to withstand weather conditions.

Now, the present invention will be described more specifically below with reference to working examples and comparative experiments.

COMPARATIVE EXPERIMENTS 1-19 AND EXAMPLES 1-8

Ethylene-tetrafluoroethylene copolymers containing ethylene and tetrafluoroethylene in varying molar ratios were each melted in a monoaxial extruder at 340° C., extruded through a T die and cooled at a various cooling speeds of [(melting point minus 10° C.)—(melting point minus 100° C.)] to provide unstretched films 100μ in thickness. These unstretched films were biaxially stretched with a test stretcher under varying conditions. The results are shown in Table 1. In test runs involving two-way successively biaxial stretching, the stretching was difficult. In some test runs involving simultaneous biaxial stretching, the stretching was difficult and entailed the phenomenon of necking when physical constants of the resin such as crystallization property and cooling condition and stretching conditions were not in accordance with this invention.

TABLE 1

| Example No. | Characteristic Value of Crystallization ($\Delta T$) (°C.) | Cooling Speed (°C./sec) | Conditions of Stretching | | | Condition of Stretched Film | Rating |
| --- | --- | --- | --- | --- | --- | --- | --- |
| | | | Method of Stretching | Stretching Ratio (MD × TD) | Stretching Temperature (°C.) | | |
| Comp. Ex. 1 | 28 | 131 | Two-way successively biaxial | 2 × 2 | 80 | Rupture during lateral stretching | Poor |
| Comp. Ex. 2 | " | " | Two-way successively biaxial | " | 100 | Rupture during lateral stretching | " |
| Comp. Ex. 3 | " | " | Two-way successively | " | 130 | Rupture during lateral stretching | " |

TABLE 1-continued

| Example No. | Characteristic Value of Crystallization (ΔT) (°C.) | Cooling Speed (°C./sec) | Conditions of Stretching | | | Condition of Stretched Film | Rating |
|---|---|---|---|---|---|---|---|
| | | | Method of Stretching | Stretching Ratio (MD × TD) | Stretching Temperature (°C.) | | |
| Comp. Ex. 4 | " | " | biaxial Two-way successively biaxial | " | 150 | Rupture during lateral stretching | " |
| Comp. Ex. 5 | 11 | 83 | Simultaneous biaxial | " | 100 | Rupture | " |
| Comp. Ex. 6 | " | " | Simultaneous biaxial | " | 130 | " | " |
| Comp. Ex. 7 | 20 | 54 | Simultaneous biaxial | " | 100 | Necking | " |
| Comp. Ex. 8 | " | " | Simultaneous biaxial | " | 130 | " | " |
| Comp. Ex. 9 | " | 83 | Simultaneous biaxial | " | 40 | " | " |
| Example 1 | " | " | Simultaneous biaxial | " | 70 | Stretchable | Good |
| Example 2 | " | " | Simultaneous biaxial | " | 100 | " | " |
| Example 3 | " | " | Simultaneous biaxial | " | 130 | " | " |
| Comp. Ex. 10 | " | " | Simultaneous biaxial | " | 170 | Necking | Poor |
| Comp. Ex. 11 | 28 | " | Simultaneous biaxial | " | 40 | " | " |
| Example 4 | " | " | Simultaneous biaxial | " | 70 | Stretchable | Good |
| Example 5 | " | " | Simultaneous biaxial | " | 100 | " | " |
| Example 6 | " | " | Simultaneous biaxial | " | 130 | " | " |
| Comp. Ex. 12 | " | " | Simultaneous biaxial | " | 170 | Necking | Poor |
| Example 7 | " | " | Simultaneous biaxial | 2.5 × 2.5 | 100 | Stretchable | Good |
| Example 8 | " | " | Simultaneous biaxial | " | 130 | " | " |
| Comp. Ex. 13 | " | " | Simultaneous biaxial | " | 170 | Necking | Poor |
| Comp. Ex. 14 | 71 | " | Simultaneous biaxial | 2 × 2 | 100 | " | " |
| Comp. Ex. 15 | " | " | Simultaneous biaxial | " | 130 | " | " |
| Comp. Ex. 16 | " | " | Simultaneous biaxial | " | 170 | " | " |
| Comp. Ex. 17 | " | 131 | Simultaneous biaxial | " | 100 | " | " |
| Comp. Ex. 18 | " | " | Simultaneous biaxial | " | 130 | " | " |
| Comp. Ex. 19 | " | " | Simultaneous biaxial | " | 170 | Rupture | " |

EXAMPLE 9

Unstretched film as used in Examples 4 to 8 was subjected to simultaneous biaxial stretching with a tenter type continuous simultaneous biaxial stretching machine to 3.0×3.0 times in the longitudinal and lateral directions under the conditions of 130° C. of temperature and 500 mm/second of stretching speed. Then, it was immediately heat set at 200° C. after relaxing by 2% in the lateral direction.

The stretched film was tested for properties indicated in Table 2 below. The results of test also given in the same table indicate that the stretched film enjoyed strikingly improved properties over the unstretched film.

TABLE 2

| | Direction | Tensile Strength at Rupture (kg/mm²) | Elongation at Rupture (%) | Tensile Modulus (kg/mm²) |
|---|---|---|---|---|
| Unstretched Film | Longitudinal | 4.7 | 332 | 62 |
| | Lateral | 4.4 | 365 | 73 |
| Stretched Film | Longitudinal | 20.3 | 104 | 135 |
| | Lateral | 19.5 | 111 | 138 |

While the invention has been described in detail and with reference to specific embodiments thereof, it will be apparent to one skilled in the art that various changes and modifications can be made therein without departing from the spirit and scope thereof.

What is claimed is:

1. A biaxially stretched film containing at least 90 mol % of ethylene-tetrafluoroethylene copolymer, having a value of crystallization property, $\Delta T$, expressed by the equation $$\Delta T = T_m - T_c$$

wherein $T_m$ (melting point) stands for the peak melting temperature (°C.) found when a sample is heated at a temperature increase rate of 20° C./minute using differential scanning calorimeter (DSC), and $T_c$ (crystallizing temperature during fall of temperature) stands for the peak crystallizing temperature (°C.) found when the sample is cooled at a temperature decrease rate of 80° C./minute from the melting point plus 20° C. using said DSC, of not less than 15° C. and not more than 60° C., prepared by a method comprising heating a thermoplastic resin containing at least 90 mol % of ethylene-tetrafluoroethylene copolymer to form a molten resin, extruding the molten resin through a die, and cooling the extruded molten resin at a cooling speed of at least 70° C./second in the range of the melting point minus 10° C. to the melting point minus 100° C. to thereby form a film while simultaneously biaxially stretching said film to at least two times the original size in each of the longitudinal and lateral directions.

2. A biaxially stretched film according to claim 1, wherein the film is stretched in a range betwen 50° C. and 160° C.

3. A biaxially stretched film according to claim 1, wherein the film is stretched in a range betwen 70° C. and 150° C.

4. A biaxially stretched film according to claim 1, wherein the ratio of ethylene to tetrafluoroethylene is in a range of from 40/60 to 70/30.

5. A biaxially stretched film according to claim 2, wherein the ratio of ethylene to tetrafluoroethylene is in a range of from 40/60 to 70/30.

6. A biaxially stretched film according to claim 1, wherein the ratio of ethylene to tetrafluoroethylene is in a range of from 45/55 to 60/40.

7. A biaxially stretched film according to claim 2, wherein the ratio of ethylene to tetrafluoroethylene is in a range of from 45/55 to 60/40.

8. A biaxially stretched film according to claim 1 containing at least 90 mole % of ethylene-tetrafluoroethylene copolymer, and further containing a fluoroolefin other than tetrafluoroethylene in such an amount as to provide a total fluorine content in the range of from 40 to 75% by weight.

9. A biaxially stretched film according to claim 2 containing at least 90 mol % of ethylene-tetrafluoroethylene copolymer, and further containing a fluoroolefin other than tetrafluoroethylene in such an amount as to provide a total fluorine content in the range of from 40 to 75% by weight.

10. A biaxially stretched film according to claim 4 containing at least 90 mol % of ethylene-tetrafluoroethylene copolymer, and further containing a fluoroolefin other than tetrafluoroethylene in such an amount as to provide a total fluorine content in the range of from 40 to 75% by weight.

11. A biaxially stretched film according to claim 5 containing at least 90 mol % of ethylene-tetrafluoroethylene copolymer, and further containing a fluoroolefin other than tetrafluoroethylene in such an amount as to provide a total fluorine content in the range of from 40 to 75% by weight.

12. A biaxially stretched film according to claim 1, wherein the copolymer has a value of crystallization property $\Delta T$ of not less than 20° C. and not more than 55° C.

13. A biaxially stretched film according to claim 2, wherein the copolymer has a value of crystallization property $\Delta T$ of not less than 20° C. and not more than 55° C.

14. A biaxially stretched film according to claim 4, wherein the copolymer has a value of crystallization property $\Delta T$ of not less than 20° C. and not more than 55° C.

15. A biaxially stretched film according to claim 5, wherein the copolymer has a value of crystallization property $\Delta T$ of not less than 20° C. and not more than 55° C.

16. A biaxially stretched film according to claim 1, wherein the film is stretched to at least 2.5 times the original size in each of the longitudinal and lateral directions.

17. A biaxially stretched film according to claim 2, wherein the film is stretched to at least 2.5 times the original size in each of the longitudinal and lateral directions.

18. A biaxially stretched film according to claim 4, wherein the film is stretched to at least 2.5 times the original size in each of the longitudinal and lateral directions.

19. A biaxially stretched film according to claim 5, wherein the film is stretched to at least 2.5 times the original size in each of the longitudinal and lateral directions.

20. A method for the manufacture of a stretched fluorine type film, comprising the steps of heating a thermoplastic resin containing at least 90 mol % of ethylene-tetrafluoroethylene copolymer, having a value of crystallization property, expressed by the equation $$\Delta T = T_m - T_c$$

wherein $T_m$ (melting point) stands for the peak melting temperature (°C.) found when a sample is heated at a temperature increase rate of 20° C./minute using differential scanning calorimeter (DSC), and $T_c$ (crystallizing temperature during fall of temperature) stands for the peak crystallizing temperature (°C.) found when the sample is cooled at a temperature decrease rate of 80° C./minute from the melting point plus 20° C. using said DSC, of not less than 15° C. and not more than 60° C., to form a molten resin;

extruding the molten resin through a die; and cooling the extruded molten resin at a cooling speed of at least 70° C. in the range of the melting point minus 10° C. to the melting point minus 100° C. to thereby form a film while simultaneously biaxially stretching said film to at least two times the original size in each of the longitudinal and lateral directions.

21. A biaxially stretched film according to claim 1, wherein the biaxially stretched film is heat set at a temperature exceeding 160° C. and not exceeding the melting point in a condition of limited shrinkage within 20%, increased length, or fixed length.

22. A method according to claim 20, wherein the biaxially stretched film is heat set at a temperature exceeding 160° C. and not exceeding the melting point in a condition of limited shrinkage within 20%, increased length, or fixed length.

* * * * *